(12) United States Patent
Doan

(10) Patent No.: US 6,985,073 B1
(45) Date of Patent: Jan. 10, 2006

(54) APPARATUS FOR MONITORING TRAFFIC SIGNALS AND ALERTING DRIVERS

(76) Inventor: Duc Doan, 4125 S. Figueroa St. Apt. 301, Los Angeles, CA (US) 90037-2087

( * ) Notice: Subject to any disclaimer, the term of this patent is extended or adjusted under 35 U.S.C. 154(b) by 0 days.

(21) Appl. No.: 11/015,893

(22) Filed: Dec. 20, 2004

(51) Int. Cl.
*B60Q 1/00* (2006.01)

(52) U.S. Cl. .................. 340/425.5; 340/457; 340/474; 356/218

(58) Field of Classification Search ............ 340/425.5, 340/457, 474, 426.19, 901, 907, 942; 356/218, 356/401; 250/206, 208.1; 362/487
See application file for complete search history.

(56) References Cited

U.S. PATENT DOCUMENTS

| | | | |
|---|---|---|---|
| 5,426,294 A * | 6/1995 | Kobayashi et al. | ......... 250/226 |
| 6,396,417 B2 * | 5/2002 | Lee | ............................ 340/904 |
| 6,580,374 B2 * | 6/2003 | Schrage | ...................... 340/933 |
| 6,774,988 B2 * | 8/2004 | Stam et al. | ................. 356/218 |
| 2002/0135471 A1 * | 9/2002 | Corbitt et al. | .............. 340/436 |

* cited by examiner

*Primary Examiner*—Phung T. Nguyen
(74) *Attorney, Agent, or Firm*—Edward E. Roberts

(57) ABSTRACT

The invention provides traffic safety apparatus including light-to-frequency converters for monitoring the status of traffic signals and tail lights of same lane close proximity preceding vehicles and when dangerous or potentially dangerous conditions are detected, visually and/or audibly providing an alert signal to the driver. The monitored information can be real-time recorded in the drivers vehicle and if desired, transmitted by wireless to off-vehicle receivers. Recording the information in the vehicle establishes an operational history that can be important for such uses as accident reconstruction, whereas information transmitted by wireless can be recorded by entities such as law enforcement, thereby adding an additional measure of traffic safety as well as providing documentation of driving infractions.

22 Claims, 5 Drawing Sheets

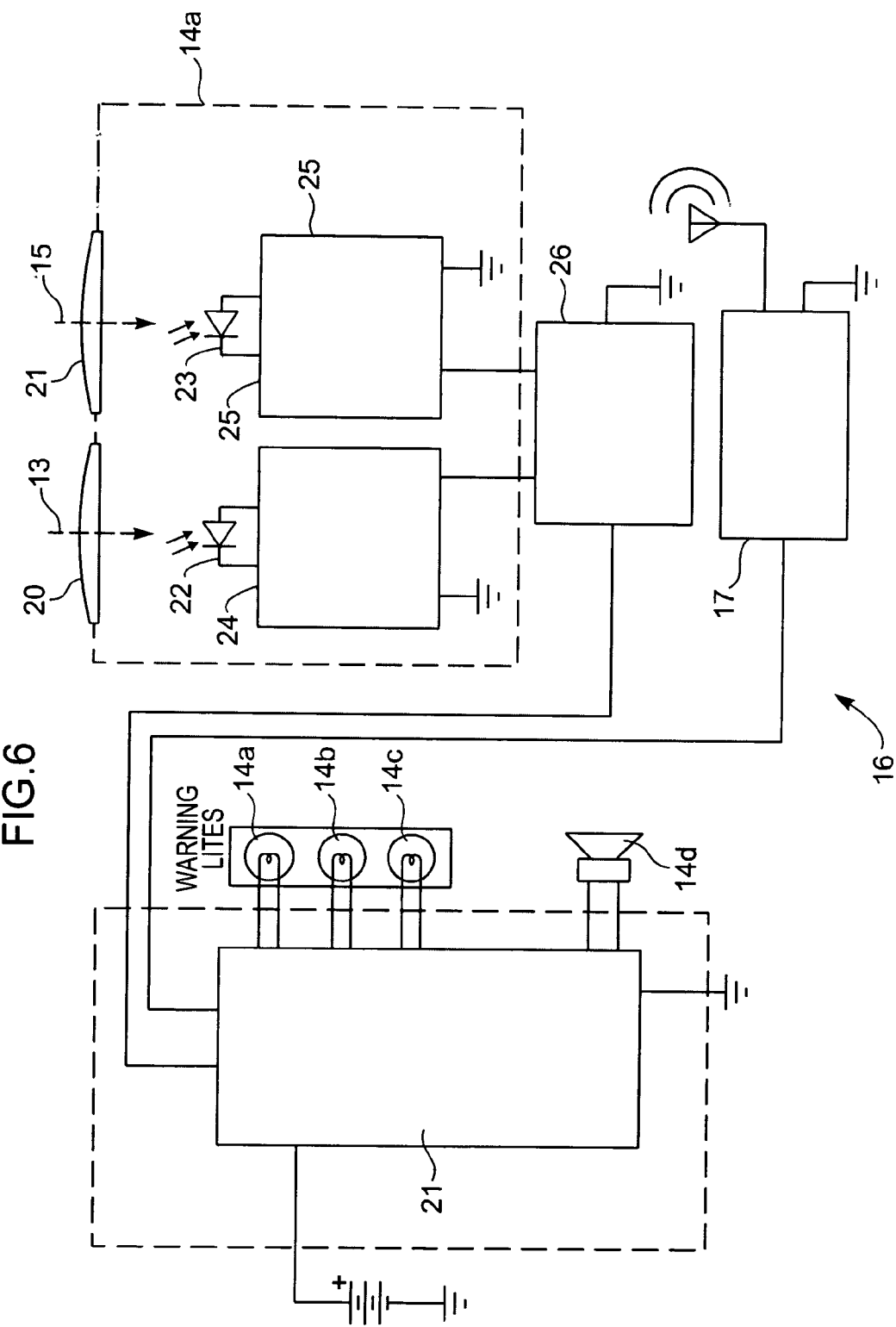

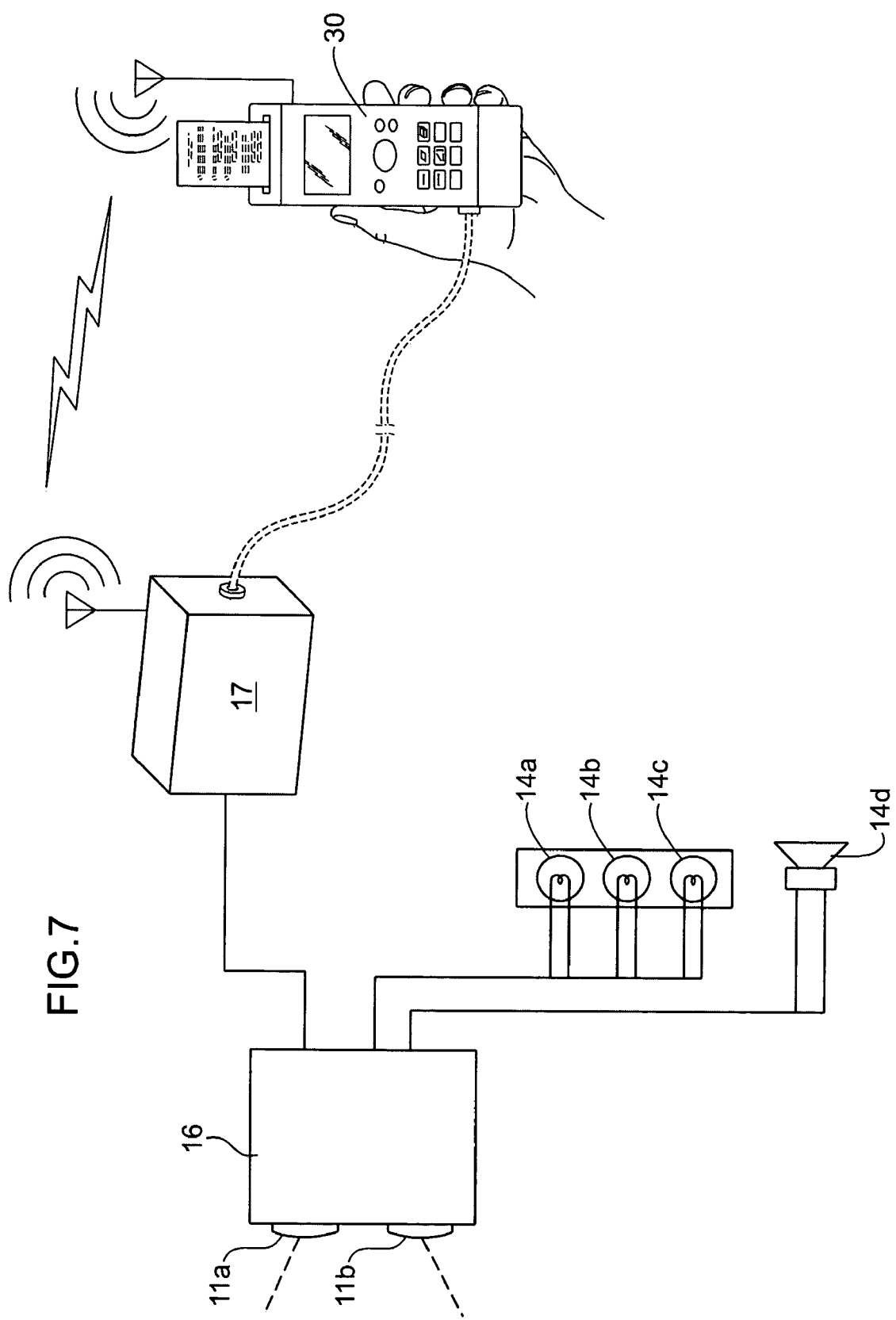

APPARATUS FOR MONITORING TRAFFIC SIGNALS AND ALERTING DRIVERS

BACKGROUND

The background of the invention will be discussed in two parts.

FIELD OF THE INVENTION

The present invention relates generally to vehicle safety apparatus for traffic control and accident avoidance, and more particularly to apparatus including light-to-frequency converters for monitoring traffic signals to alert drivers to the status of stop lights and of monitoring of tail lights of preceding vehicles to alert drivers of the presence of such vehicles in the immediate vicinity. Monitored information can be real-time recorded in the vehicle and transmitted by wireless to off-vehicle receivers.

In many instances vehicle drivers do not engage in adequately safe driving habits, either because of a propensity to ignore such habits, or as a result of inadequate attention to or warning of situational driving conditions. This is particularly a problem where drivers go through red lights or when a driver is not sufficiently alerted to a preceding stopping vehicle such that a "rear-ender" occurs. If, in addition to proper visual and/or audible warning to the driver, situational vehicular operation is real time recorded in the vehicle, there is provided a record that can be valuable in accident fault determination, and if the situational information can be transmitted exterior of the vehicle by wireless transmission, such information can be useful by law enforcement in accident avoidance, fault determination, and overall traffic control.

DESCRIPTION OF THE PRIOR ART

Conventional passenger and cargo vehicles typically display certain information to the driver relative to operational status of the vehicle, these displays normally in the instrument panel directly in front of the driver. However, prior art safeguards do not adequately provide for communication to the driver of exterior situational driving situations that are critical to traffic control and accident avoidance. Thus, for various reasons the driver may not notice a dangerous situation that could lead to a serious accident. In recognition of limitations in the prior art, the present invention provides for photodiode light-to-frequency sensor units to be positioned in the vehicle to monitor traffic stop light signals being approached by the vehicle. Visual display units are included in the vehicle such that the color status of the traffic lights is continuously and prominently displayed to the driver thereby immediately alerting the driver to dangerous and potential dangerous driving situations. Audible signals may also be included to alert the driver to the color status of the traffic lights.

In like manner light-to-frequency sensors are mounted in vehicles to monitor the tail lights of closely preceding vehicles to immediately alert the driver to dangerous and potential dangerous driving situations. Such monitoring of tail lights during the day will alert the driver when the tail lights of a close proximity preceding vehicle are applied. During the night the driver will be alerted to the dangerous proximity of a preceding vehicle. Thus, the driver and any following motorists can be put on notice so as to exercise necessary caution.

It is thus an aspect of the invention to provide light-to-frequency sensor apparatus for monitoring traffic signals at stop lights to alert drivers to the status of stop lights.

It is another aspect to provide light-to-frequency sensor apparatus for monitoring preceding vehicle tail lights to alert drivers during the day when a closely preceding vehicle is in the tail mode and at night of the presence of a closely preceding vehicle.

It is another aspect to provide apparatus for on-board recording of monitored traffic stop light signals and tail lights of close proximity preceding vehicles.

It is another aspect to provide apparatus for wireless transmission of on-board monitored and recorded traffic stop light signals and tail lights of close proximity preceding vehicles, and for off-vehicle reception of such transmission.

It is another aspect of the present invention to provide vehicle on-board apparatus for collision avoidance, traffic control, incident detection and management and safety, the apparatus including color-to frequency monitoring sensors and scanners, processors, displays, visual and audio warning devices, and radio transmitters and receivers, all of which interact and are integrated.

The foregoing and other objects, features and advantages within the spirit of the invention will become readily apparent from a reading of the specification when taken in conjunction with the drawings in which like reference numerals refer to like elements in the several views.

SUMMARY

The invention provides traffic safety apparatus including light-to-frequency converters for monitoring the status of traffic signals, and when dangerous or potentially dangerous conditions are detected, visually and/or audibly providing an alert signal to the driver. Alerting signals may be designed to continue for a period of time and then revert to a normal condition. Tail lights of same lane close proximity preceding vehicles are monitored to alert following drivers during the day when preceding vehicles are in the braking mode, and at night of the close presence of the preceding vehicles. The monitored information can be real-time recorded in the drivers vehicle and if desired, transmitted by wireless to off-vehicle receivers. Recording the information in the vehicle establishes an operational history that can be important for such uses as accident reconstruction, whereas information transmitted by wireless can be recorded by entities such as law enforcement, thereby adding an additional measure of traffic safety as well as providing documentation of driving infractions.

DRAWINGS

FIG. 6 is an electronic circuitry functional block diagram accordance with the invention; and FIG. 7 is a functional block diagram further depicting functions of the apparatus of the invention including wireless reception of information by hand-held receiver/printers.

DESCRIPTION

Figure 1:
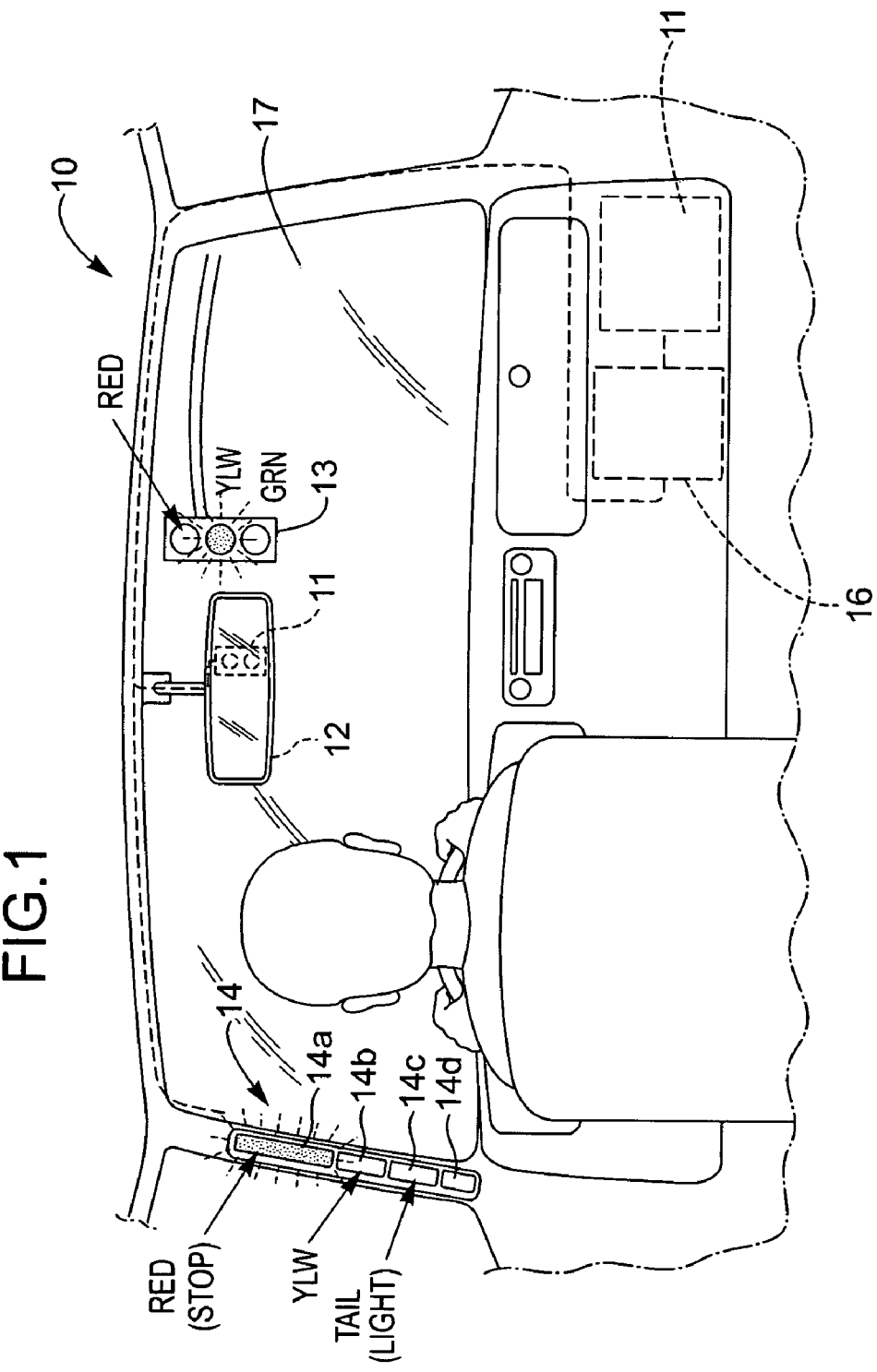
FIG. 1 is a plan view illustrating a vehicle interior display providing driver visibility of monitored traffic stop lights, and of tail lights of preceding vehicles in accordance with the invention.

Referring to the drawings in general there is illustrated and disclosed apparatus for light-to-frequency monitoring of traffic stop lights and of tail lights of same lane preceding vehicles, and providing this information in real time for immediate visual and/or audible communication to the vehicle driver. Means are also provided for on-board recording of the information as well as wireless communication of the information exterior of the vehicle. Wireless receivers may include hand-held receiver/printers for use by law enforcement, or other receiver/recorders as may be desired. As to light-to-frequency technology, articles published on the subject by Texas Advanced Optoelectronic Solutions, Inc. of Plano, Texas in December 2003 and January 2004 are illustrative of the art and are hereby incorporated by reference.

Although various equipment configurations may be used in accordance with the invention, the apparatus shown and described is typical and comprises in general, sensor/scanner monitoring devices, data processing electronics, display units, audible alert means, data recorders, and wireless transmission and reception capabilities. In new vehicles wherein properties of the invention are included at manufacture, the visual display is positioned to provide constant and suitable visibility by a driver looking straight ahead at the roadway. Such a position could include location in the vehicle frame next to the windshield, although other locations are suitable if providing adequate driver visibility. In new vehicles associated electronics and wiring will be concealed, whereas for after-market installation the displays and associated wiring, including wireless transmission electronics, can to be located and housed to provide adequate visibility by the driver while minimizing obstructions and maximizing appearance. Although not shown, means for video monitoring and recording of the driver and display area may also be included to monitor the driver to detect potentially dangerous conditions such as head droop, or the like, to determine whether the driver is alert, and if appropriate to activate a warning to the driver.

In FIG. 1 there is depicted an interior apparatus arrangement, generally designated 10, in accordance with the invention that provides driver visibility of monitored traffic stop lights and of tail lights of same lane preceding vehicles in accordance with the invention. The interior display arrangement 10 may include a variety of indicators which may exhibit any conventional light emitting characteristics such that information is displayed as illuminated indicia. By way of example, as illustrated in FIG. 1 the interior display arrangement 10 includes, shown in phantom, the photodiode array light color sensor/scanner detector 11, which includes traffic light sensor/scanner 11a and tail light sensor 11b, mounted onto the back of rear view mirror 12 in a manner to continuously monitor both traffic stop lights, designated 13, being approached by the vehicle, as well as tail lights (see FIG. 4) of any same lane immediately preceding vehicle. Sensor/scanner 80 may scan in both the azimuth (horizontal) and elevation (vertical) directions. As to scanning in azimuth and elevation directions, U.S. Pat. No. 5,341,141 issued to Frazier on Aug. 23, 1994.

As seen in FIG. 1, the driver alert display unit, generally designated 14, includes visual indicators for the color status of the traffic stop light 13, that is, red color indicator 14a and yellow color indicator 14b, and also visual indicator 14c for displaying a warning signal when the tail lights of the same lane preceding vehicle are illuminated. Audible speaker 14d is included for selectively alerting the driver whenever a dangerous or potentially dangerous situation exists such as when indicators 14a, 14b, or 14c are illuminated. The warning signal provides for more reaction time and thus increased safety of vehicle operation. Shown in phantom further illustrated in FIG. 6 is electronic apparatus 16 and data recorder 17 in accordance with the invention. This equipment is indicated as installed under the dashboard in the vicinity of the "glove box", however, it may be elsewhere in the vehicle as deemed suitable.

Display unit 14 can be formed as a molded member of a sufficiently strong and resilient material with indicator portions 14a,14b,14c formed of a light transmissive material. The luminescent source for the indicators 14a,14b,14c may if desired include means for receiving individual indicia, such as a letter, numeral, words, or other indicia, for enabling customization of the message thereon. Thus, each indicator 14a,14b,14c when lit may display the message of its respective indicia, for instance "TAIL". Each luminescent source is connected to a particular desired operational parameter to be monitored and will light up when this parameter reaches an operational status that is to be displayed. Otherwise the luminescent source is not lit. Even though example display unit 14 has been described, it is to be understood that it may take any appropriate configuration and be of any suitable material, the housing and lighting means determined as appropriate by the state of the art.

Figure 2:
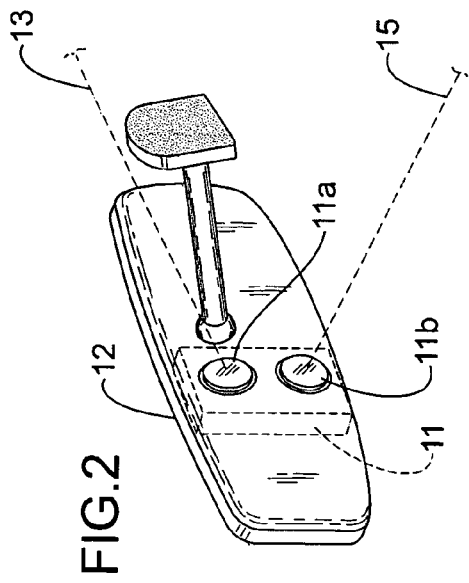
FIG. 2 illustrates an example of mounting of the photo diode array sensor of the invention to the back of the rear view mirror of the vehicle.
Figure 3:
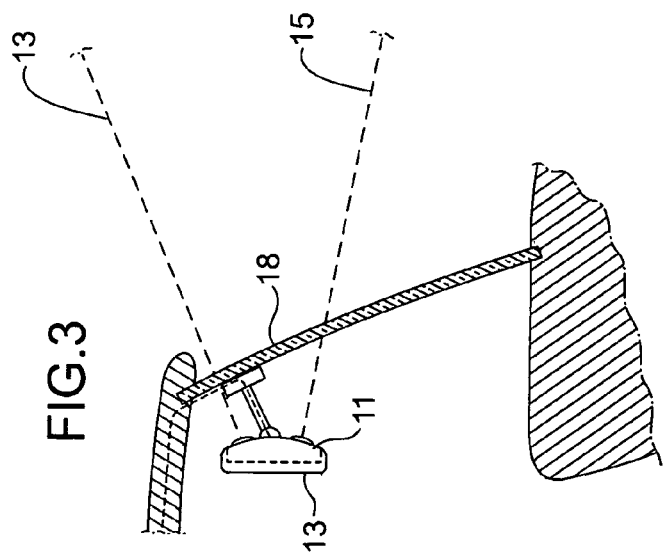
FIG. 3 illustrates positioning in the vehicle of the photo-diode array sensors of FIG. 2 for monitoring traffic stop lights and of tail lights of same lane close proximity preceding vehicles.

FIGS. 2 and 3 illustrate an example of mounting of the photodiode sensor unit 11 of the invention to the back of the rear view mirror 12 and the mounting of the mirror 12 to the interior of windshield 18 of the vehicle. Indicated is angular elevation of sensors 11a so as to properly monitor the traffic stop light 13, and angular depression of sensor 11b to properly monitor the tail lights 15 of same lane close proximity preceding vehicles. The elevation angle of sensor 11a and depression angle of sensor 11b are determined relative to parameters such as sensor color recognition capability, desired distance for monitoring of the stop light 13 and of tail lights 15, etc. Tail lights of same lane close proximity preceding vehicles are monitored to alert following drivers during the day when same lane immediately preceding vehicles are in the braking mode, and at night of the close presence of the preceding vehicles. During the day the driver would be alerted when the red brake lights are illuminated, other non-red tail lights not being detected. At night, the driver would be alerted when the red brake lights are illuminated; however, if other tail lights of preceding vehicles are also red the driver would be alerted only to the presence of same lane immediately preceding vehicles.

Figure 4:
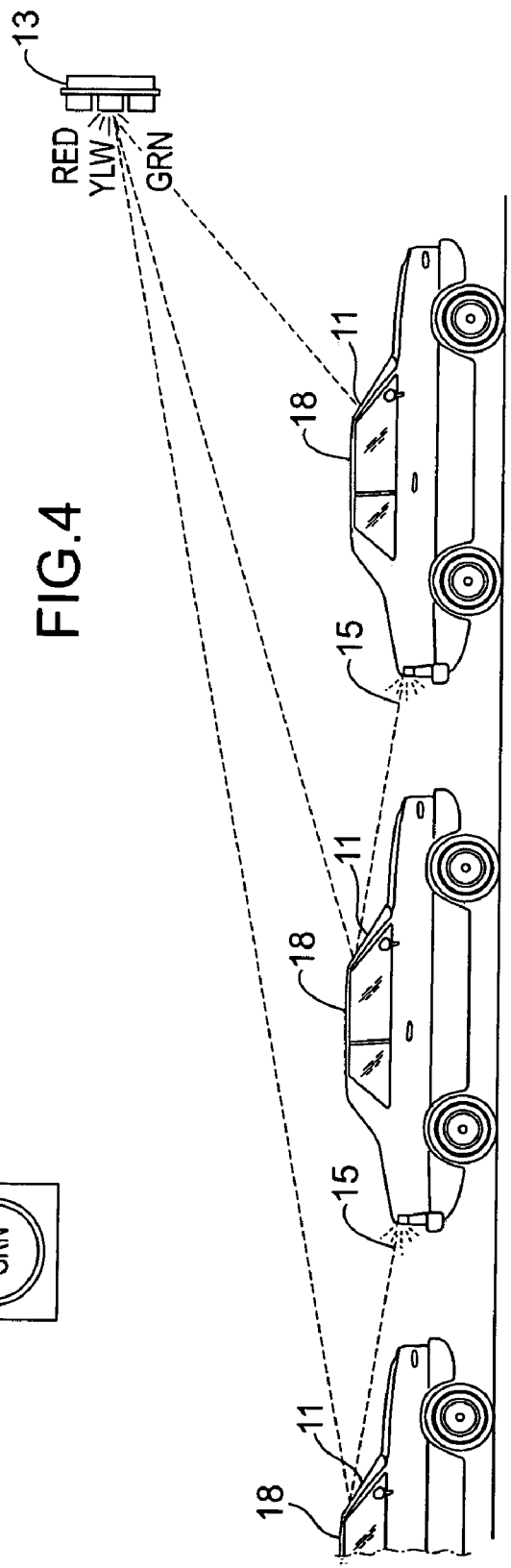
FIG. 4 illustrates an example of relative positioning of a traffic stop light and of approaching vehicles in accordance with the invention.

FIG. 4 illustrates an example of relative positioning of a traffic stop light 13 and of same lane sequentially approaching vehicles 18. In accordance with the invention sensor 11a would be designed and positioned with parameters such as the field of view, reception strength, and angle of elevation coordinating such as not to react to the tail lights 15 within the desired distance for monitoring of the tail lights 15. Likewise sensor 11b would be designed and positioned such as not to react to a same lane traffic stop light 13 within the desired distance for monitoring the stop lights of the preceding vehicle.

Figure 5:
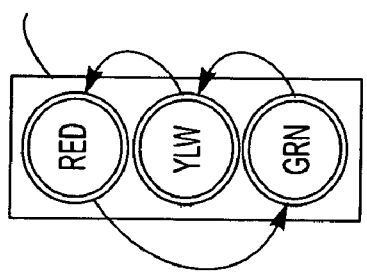
FIG. 5 illustrates the sequence of color changes for a typical traffic stop light.

FIG. 5 illustrates the sequence of color changes for a traffic stop light 13, that is, green, yellow, red. Thus, in accordance with the invention, photo diode sensor 11a is designed with light-to-frequency characteristics to recognize the colors yellow and red with the light-to-frequency converter generating a signal to illuminate indicators 14a, and 14b as appropriate. Thus, as the traffic light 13 changes from green to yellow indicator 14b will be illuminated and when it changes from yellow to red indicator 14a will be illuminated and indicator 14b can either be switched off or time delay illuminated as desired. When the traffic light 13 changes from red to green there is no reaction from sensor 11a and thus indicators 14a and 14b are no longer illuminated.

Although not shown, an embodiment of the invention would include a configuration whereby sensor 11a was designed to recognize only the color green and the electronics of the invention designed to alert the driver if green was not detected. In this case the driver would be alerted to the presence of either the yellow or red light and could react accordingly. In this configuration obvious changes to the above would be made, i.e., display 14 would not include indicator 14b for the yellow light, etc. Further, the apparatus scanner/sensors, microprocessor and displays of the invention may be designed and programmed to include monitoring of and reaction to emergency flashing lights.

FIG. 6 is a functional block diagram depicting electronic circuitry and apparatus, generally designated 16, in accordance with the invention. Depicted is color light sensor 11 and for both the traffic light sensor 11a and the tail lights sensor 11b, lenses 20 and 21, photodiode arrays 22 and 23, and color detector electronics 24 and 25. The outputs of color light sensors 11a and 11b are fed to color light-to-frequency converter 26. In turn the frequencies generated are fed to a microprocessor or controller 27. As known in the art, such microprocessors 27 include electronics for controlling multiple functions and can be designed as an integrated circuit or any similar data analyzing device. In accordance with the invention, the microprocessor 27 receives the frequencies generated in color light-to-frequency converter 26 and responds to transmit appropriate signals to illuminate the associated display indicators 14a, 14b, and/or 14c. A power source and grounding as may be appropriate is indicated. Apparatus operational data is sent to on-board recorder 17 which if desired may have capability for wireless transmission of selected data to off-board receivers.

FIG. 7 illustrates the use of wireless transmission of selected data and reception of such data by off-board receivers such as by hand-held receiver/printers. Shown is the electronic circuitry and apparatus 16 of the invention including recorder 17 and hand-held receiver/printer 30. As indicated the receiver/printer 30 and the on-board recorder 17 may be configured for local "plug in" communication as well as wireless communication. Although not shown wireless receivers may be mounted in other vehicles such as law enforcement vehicles for monitoring safety regulations. This would require a receiver such as receiver as well as special electronics to be mounted in the law enforcement vehicle. With inclusion of a global positioning system the on-board transmitter would be modified to broadcast information for location of the vehicle.

There has thus been disclosed means for monitoring both the status of traffic stop lights and the tail lights of close proximity same lane preceding vehicles, and when unacceptable anomalies appear according to preset guidelines and protocol, providing means for displaying or otherwise communicating such status or warnings to the driver. As part of the capability for override or interruption of acceptable signal representations, audible signals may be used to alert the operator of the vehicle. Provision is made for wireless communication of selected information to receiver's exterior of the vehicle.

Although the present invention has been described in connection with certain example embodiments thereof, it will be appreciated by those skilled in the art that additions, deletions, substitutions, and other modifications not specifically described herein may be made without departing from the spirit and scope of the invention.

What is claimed is:

1. Vehicle safety apparatus for monitoring traffic lights comprising:
    a) color detection means for detection of traffic light colors red, yellow and green;
    b) a plurality of warning devices including visual display means and an audio speaker;
    c) color-to-frequency converter means for converting said traffic light colors to respective electronic frequencies; and
    d) processor controller means for processing said frequencies to produce signals for activating said warning devices to alert the vehicle driver of unsafe traffic conditions depending on the color detected by said color detection means; and
    e) wherein said warning devices are activated when said color detection means detects the color red.

2. The apparatus of claim 1 wherein said color detection means includes at least one photodiode array for detection of said traffic light colors.

3. The apparatus of claim 1 configured to activate said warning devices when the color green is not detected by said color detection means.

4. The apparatus of claim 1 further including color detection means for monitoring the tail light colors of immediately preceding vehicles, converting said tail light colors to respective electronic frequencies and processing the resultant frequencies to alert the vehicle driver of unsafe traffic conditions depending on the color detected by said color detection means.

5. The apparatus of claim 1 further including a data recorder for accessible storing of processed information and wireless means for transmitting said processed information for reception by receivers exterior of the vehicle.

6. The apparatus of claim 1 further including a real-time video recording device located interior of said vehicle for monitoring said driver and a global positioning device for determining location of said vehicle.

7. A vehicle safety mechanism comprising:
    a) photodiode color scanner means for detecting selected colors;
    b) a color-to-frequency converter for converting said colors into respective electronic frequencies;
    c) a microcontroller for processing said respective frequencies and generating signals indicative of said colors;
    d) visual display means for alerting the driver of said vehicle of unsafe traffic conditions depending on the color detected by said photodiode color scanner means; and
    e) wherein said photodiode color scanner means detects sequential traffic stop light colors and the tail light colors of immediately preceding vehicles.

8. The apparatus of claim 7 wherein said warning devices are activated when said color detection means detects the color red.

9. The apparatus of claim 7 configured to activate said warning devices when the color green is not detected by said color detection means.

10. The mechanism of claim 7 further including audio means for alerting the driver of unsafe traffic conditions.

11. The mechanism of claim 7 further including recording means for storing said frequency processed signals indicative of said colors and wireless radio means for transmitting said signals.

12. Vehicular apparatus for monitoring and dissemination of vehicular traffic light information, comprising:
   means for monitoring traffic light colors from at least one monitoring device;
   means for converting said traffic light colors to respective electronic frequencies;
   a microprocessor for processing said respective electronic frequencies for conformance with pre-selected requirements and transmitting anomaly signals to at least one display warning device configured and located for alerting the driver of the vehicle depending on the color detected by said means for monitoring traffic light colors; and
   wherein said at least one warning device is activated when said means for monitoring traffic light colors detects the color red.

13. The apparatus of claim 12 configured to activate said at least one warning device when the color green is not detected by said means for monitoring traffic light colors.

14. The apparatus of claim 12 wherein said traffic light colors include traffic stop light colors, and tail light colors of immediately preceding vehicles.

15. The apparatus of claim 14 wherein said apparatus includes an accessible storage medium for storing processed color detected information and wireless transmission of said information for observer cognizance exterior of said vehicle.

16. The apparatus of claim 12 wherein said at least one of monitoring device is a real-time video recording device located interior of said vehicle.

17. The apparatus of claim 12 further including a global positioning device for determining location of said vehicle.

18. Traffic apparatus for a vehicle comprising:
   scanner means for detecting selected colors;
   means for converting said colors into respective electronic frequencies;
   means for processing said frequencies and generating electronic signals indicative of said colors;
   warning device means responsive to said electronic signals for alerting the driver of said vehicle of unsafe traffic conditions depending on the color detected by said scanner means; and
   wherein said scanner means detects sequential traffic stop light colors and said warning device means is activated when said scanner means does not detect a safe passage color.

19. The traffic apparatus of claim 18 wherein said safe passage color is green.

20. The traffic apparatus of claim 18 wherein said scanner means detects the tail light colors of immediately preceding vehicles and said warning device means is activated when said scanner means detects an unsafe tail light color.

21. The traffic apparatus of claim 20 wherein said unsafe tail light color is red.

22. The traffic apparatus of claim 18 wherein said apparatus includes means for storing processed color detected information and means for wireless transmission of said information exterior of said vehicle.

* * * * *